Apr. 24, 1923.
I. LAZAGA
1,452,692
MACHINE FOR PACKAGING ARTICLES
Filed Dec. 19, 1918  13 sheets-sheet 1
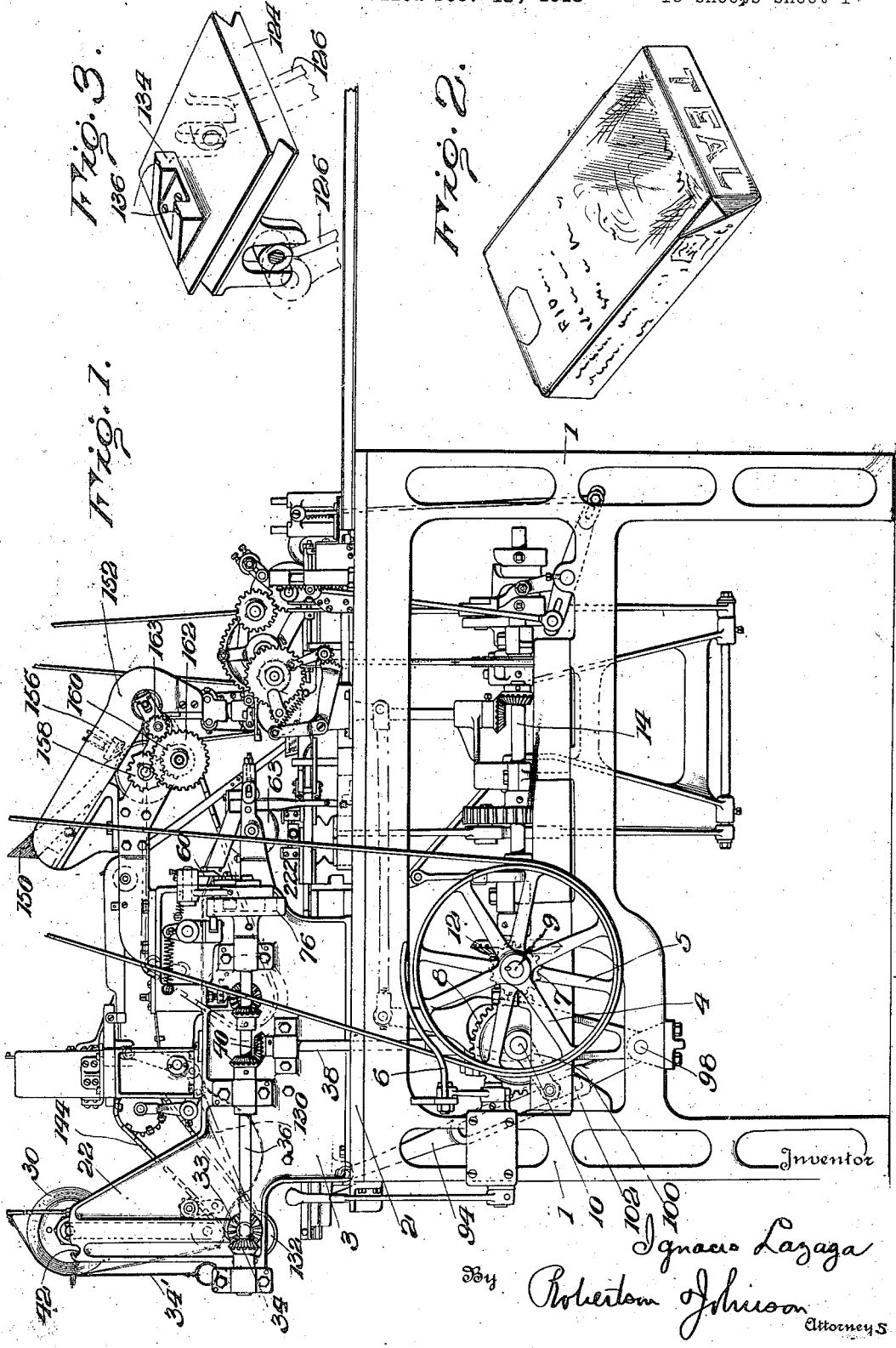

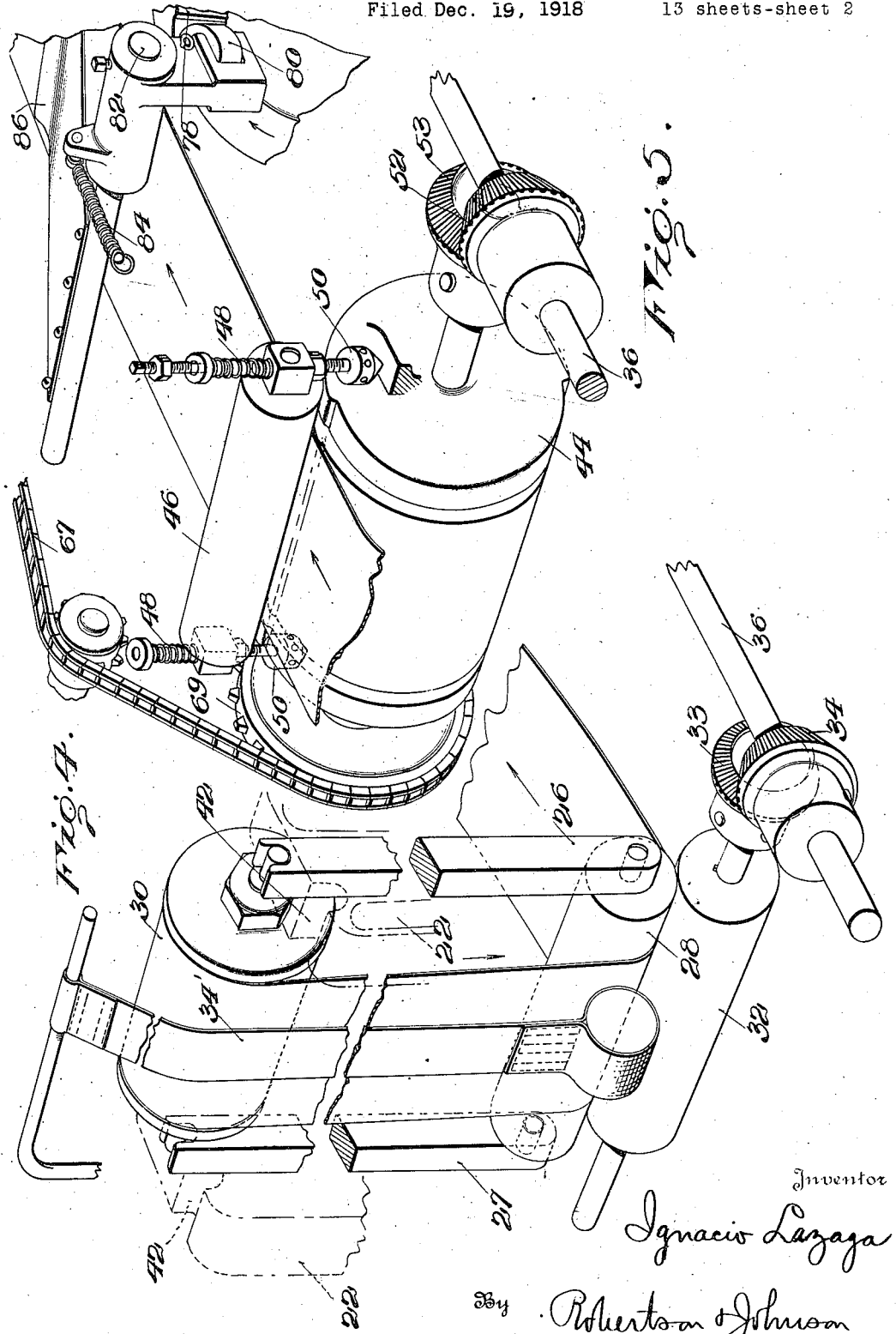

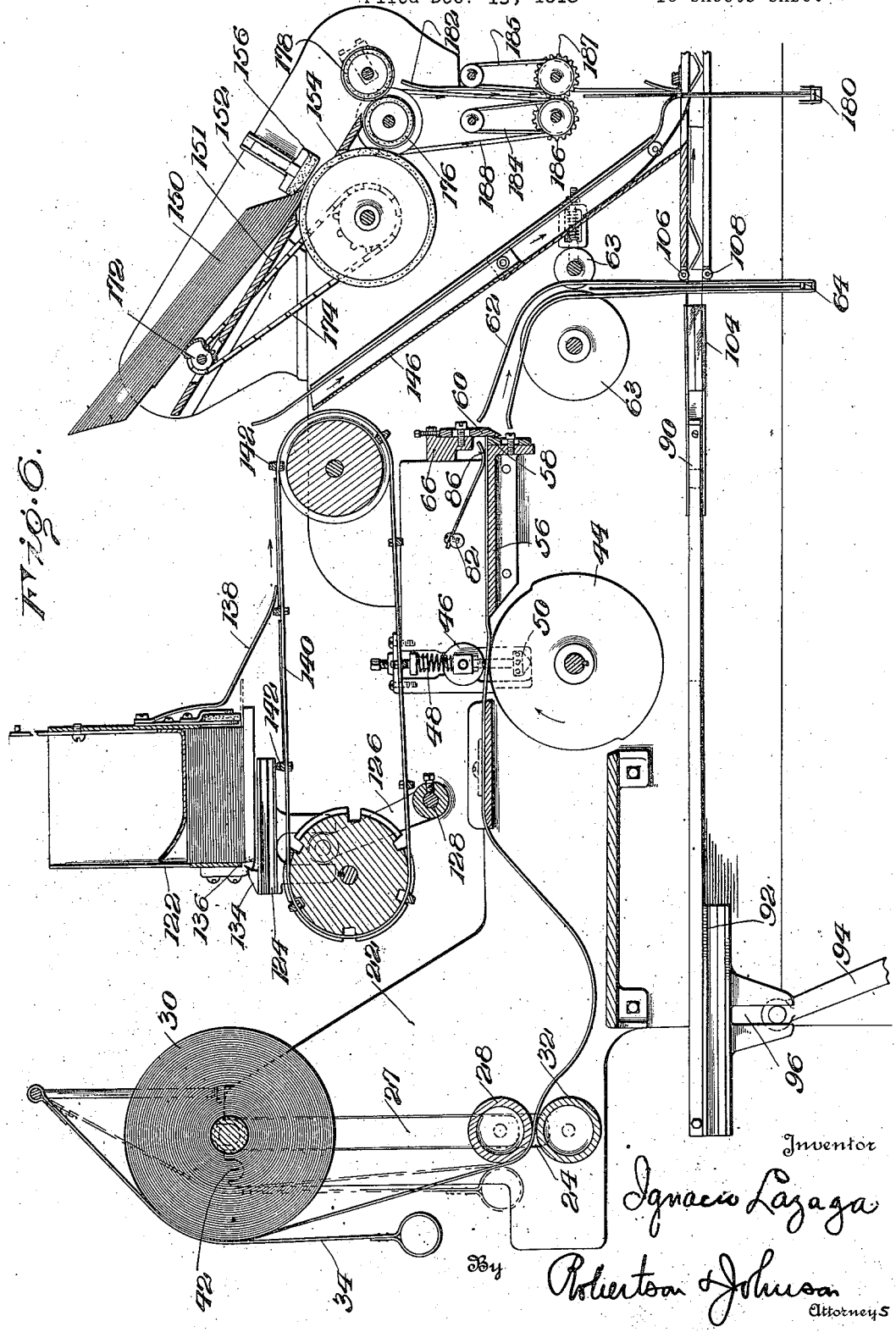

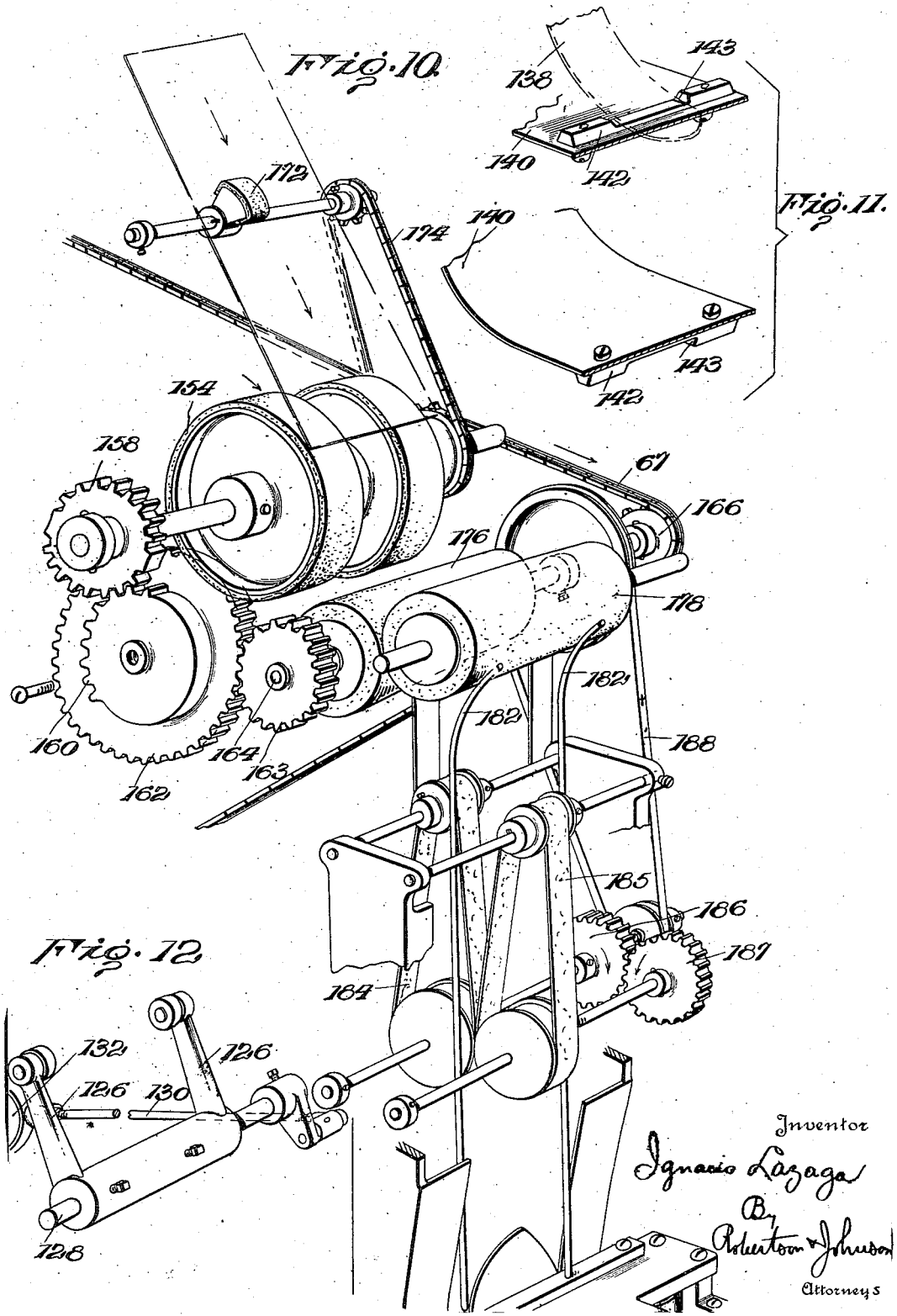

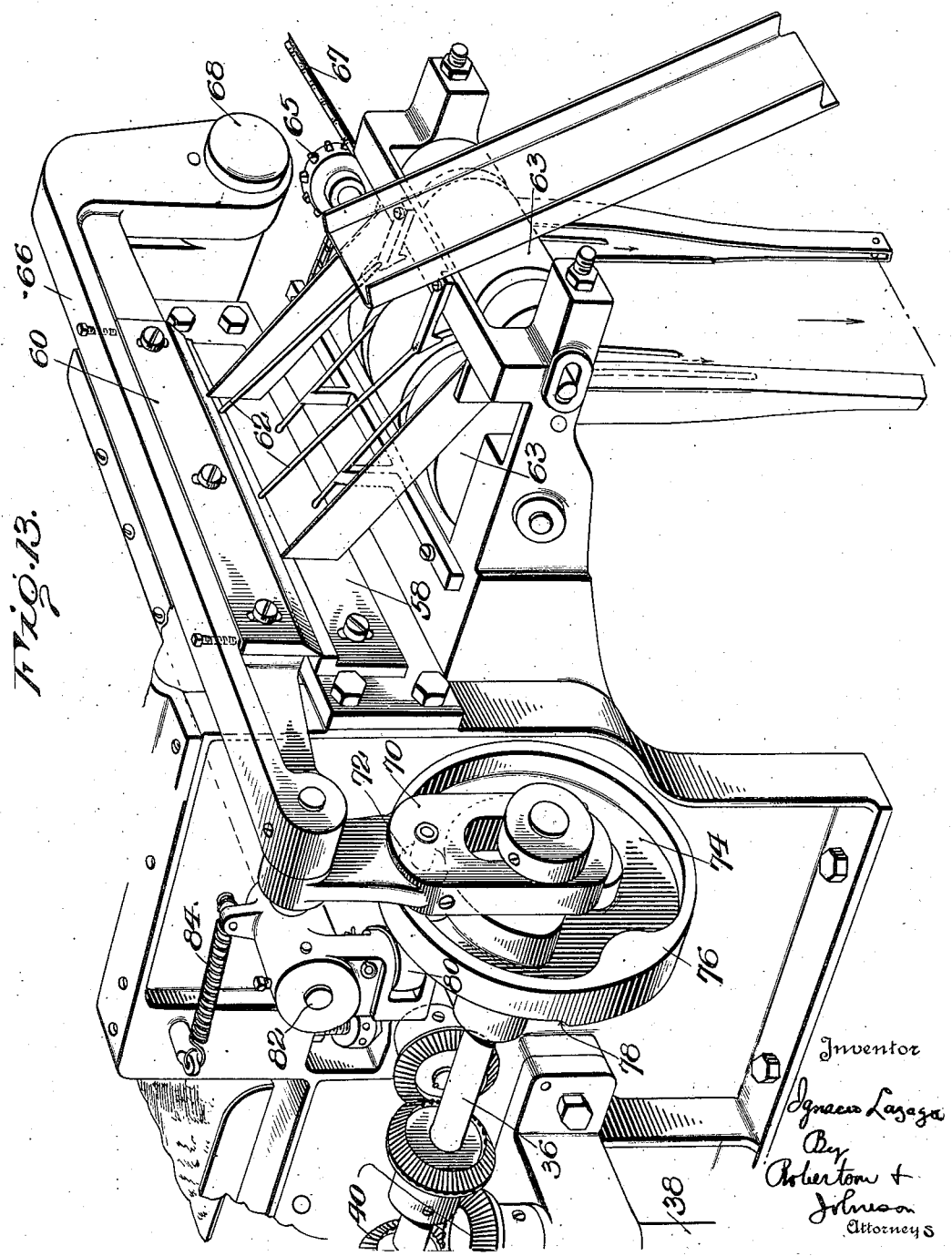

Apr. 24, 1923. 1,452,692
I. LAZAGA
MACHINE FOR PACKAGING ARTICLES
Filed Dec. 19, 1918   13 sheets-sheet 7
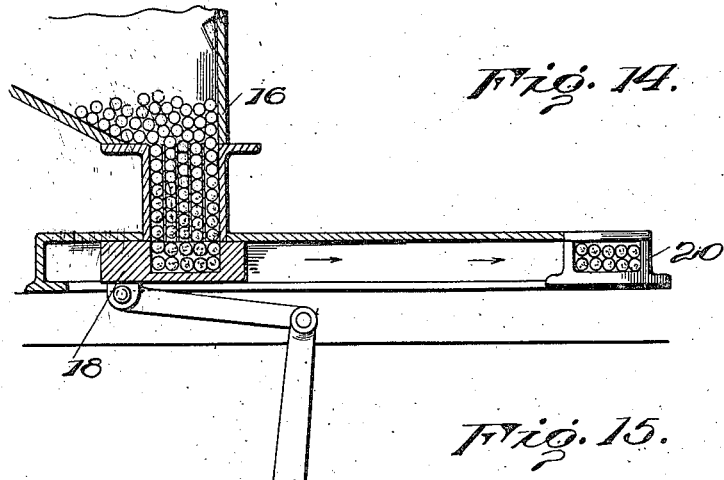
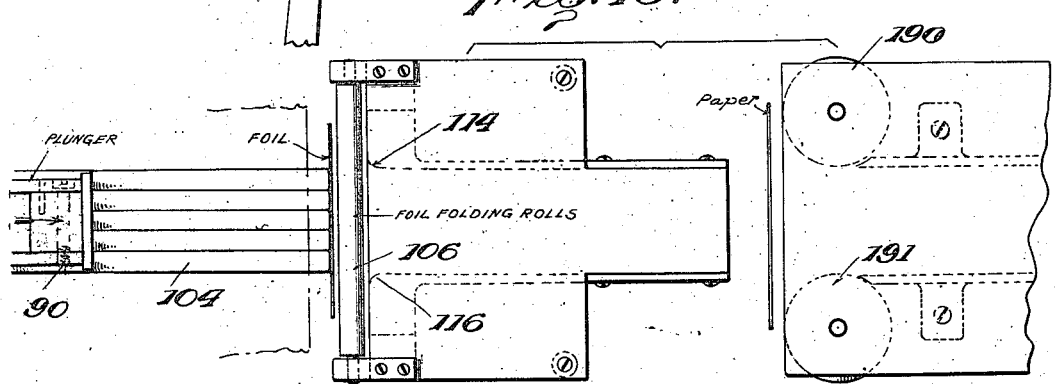
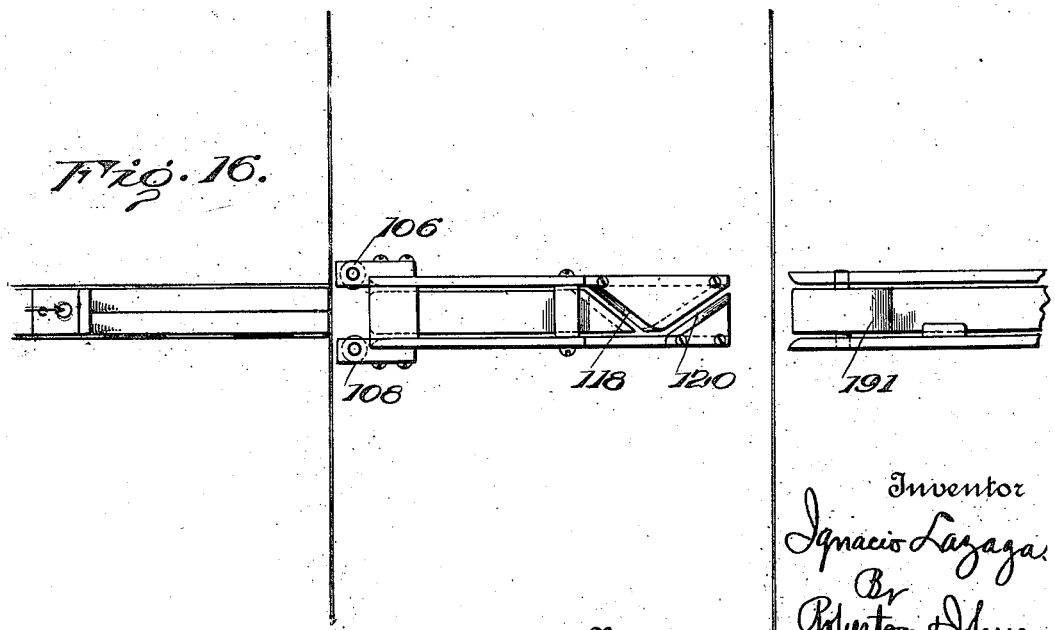
Inventor
Ignacio Lazaga,
By
Robertson & Johnson
Attorneys Apr. 24, 1923.
I. LAZAGA
1,452,692
MACHINE FOR PACKAGING ARTICLES
Filed Dec. 19, 1918   13 sheets-sheet 8
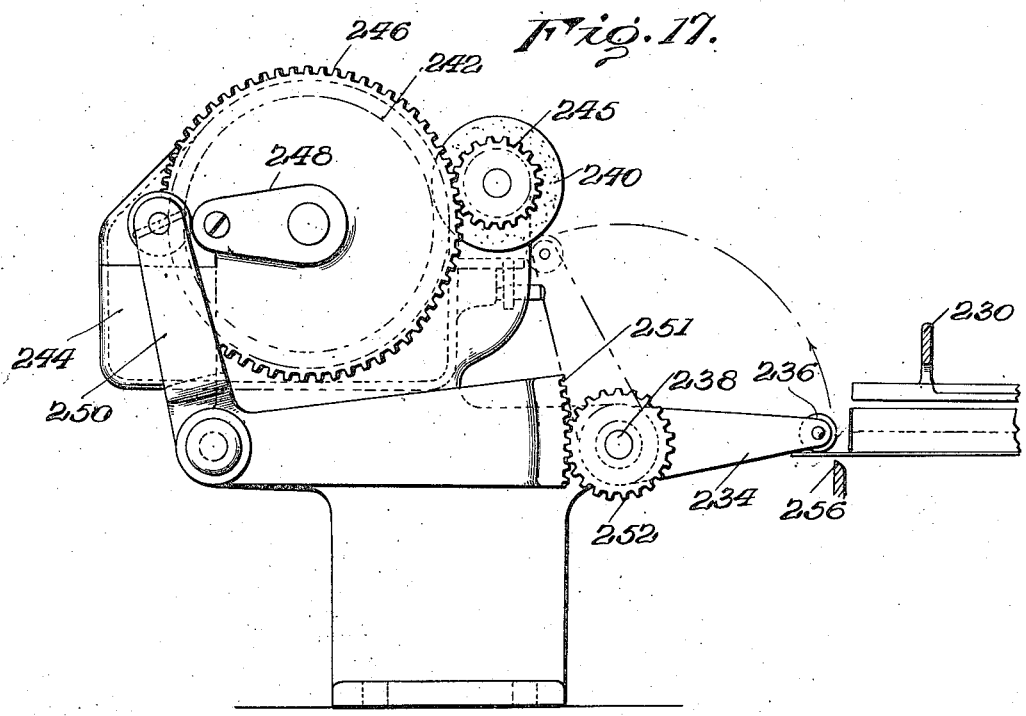
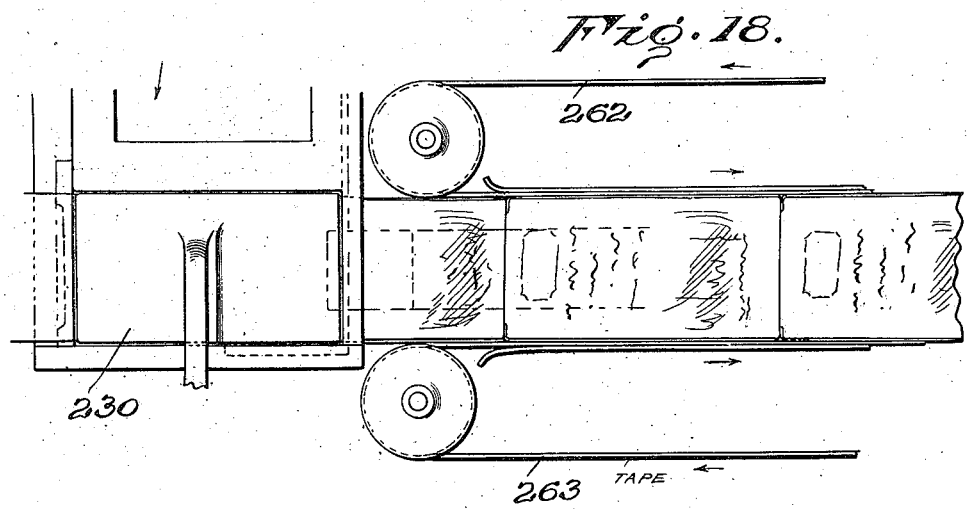

Apr. 24, 1923. 1,452,692
I. LAZAGA
MACHINE FOR PACKAGING ARTICLES
Filed Dec. 19, 1918 13 sheets-sheet 9
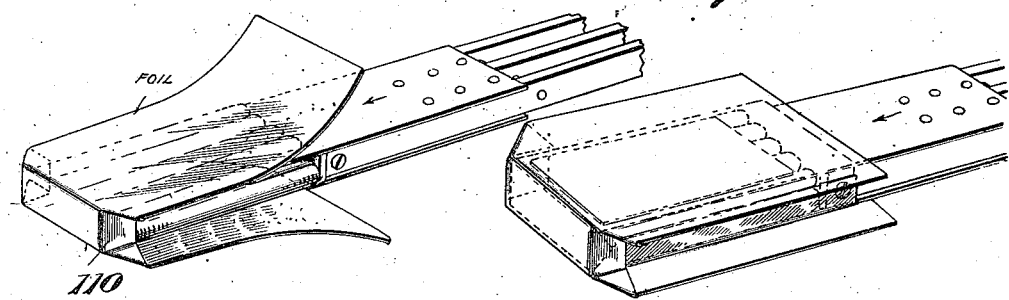
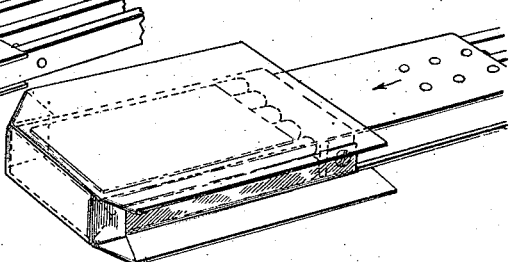
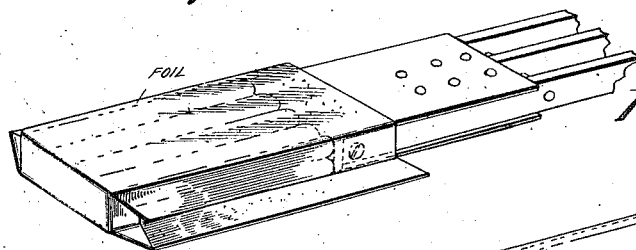
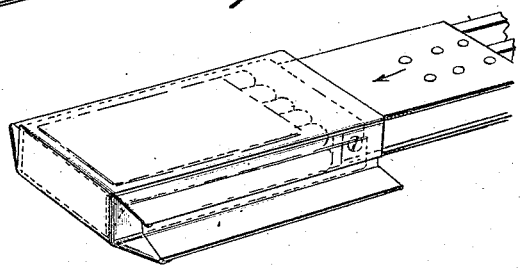
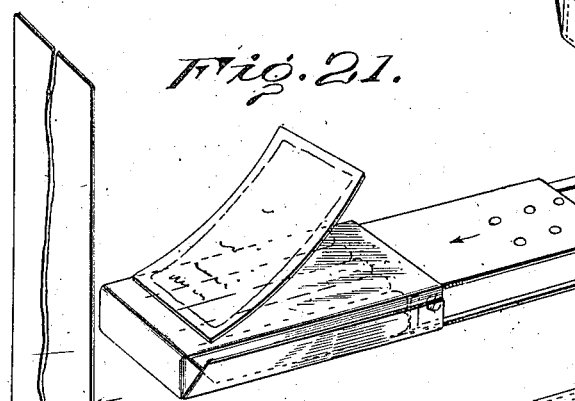
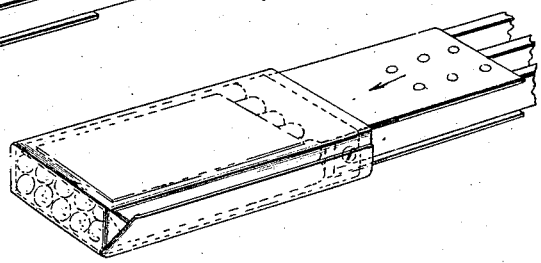
Inventor
Ignacio Lazaga
By Robertson & Johnson
Attorneys

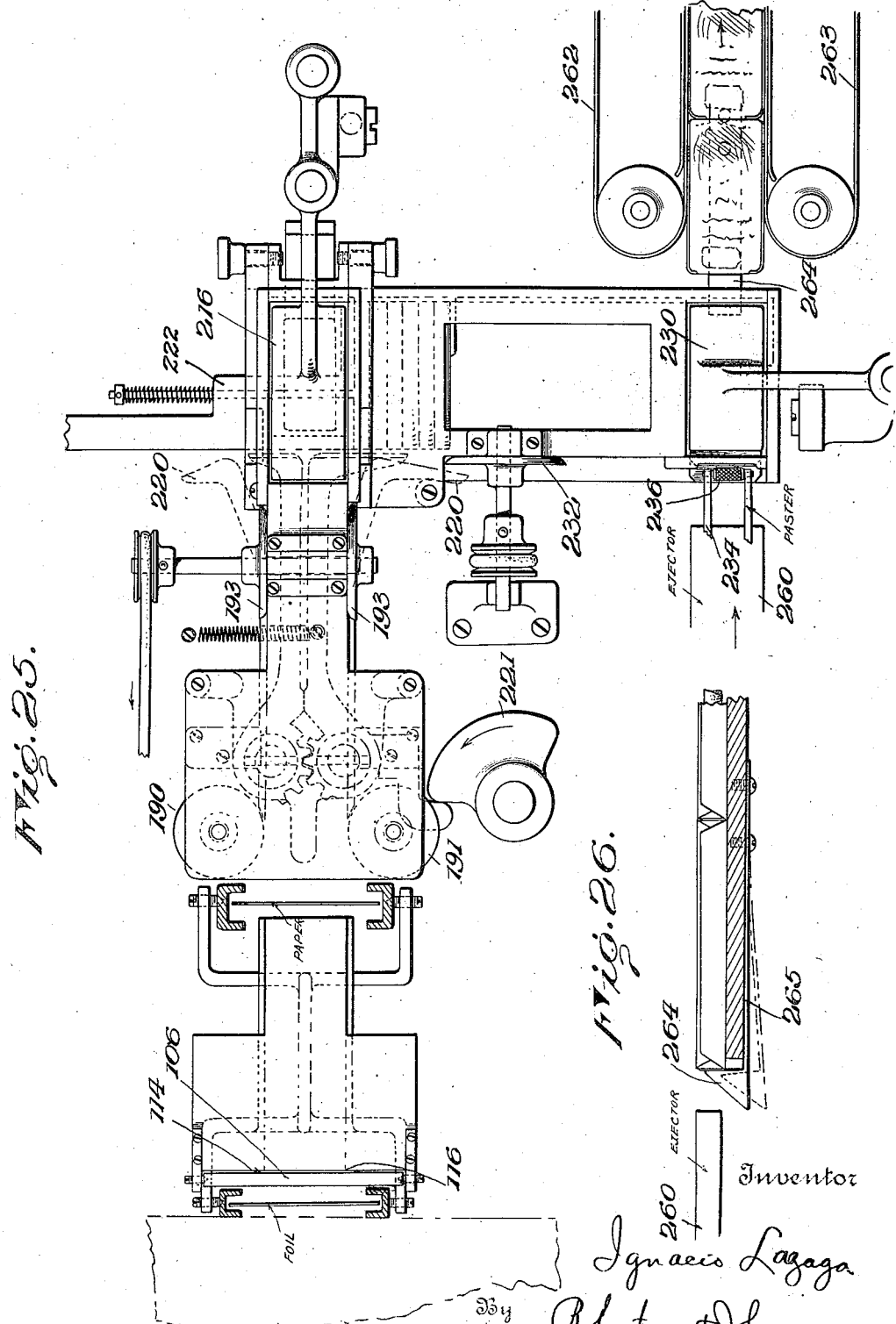

Apr. 24, 1923.
I. LAZAGA
1,452,692
MACHINE FOR PACKAGING ARTICLES
Filed Dec. 19, 1918 13 sheets-sheet 11
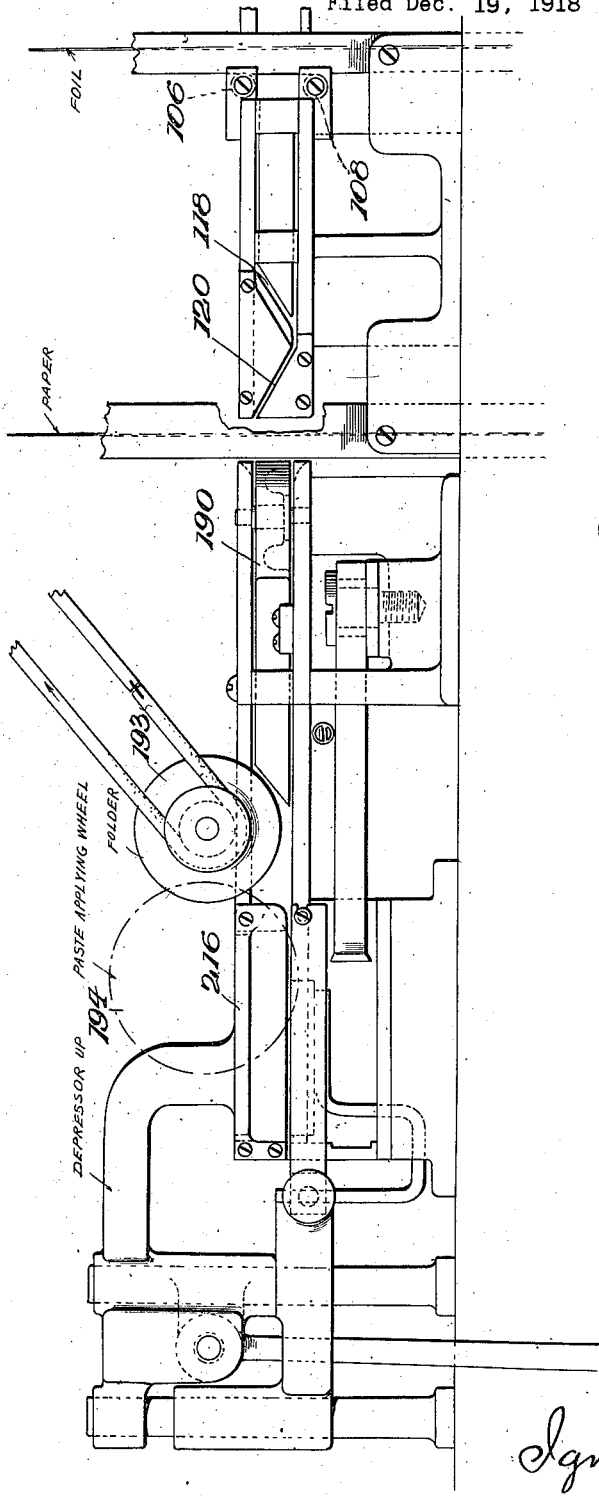
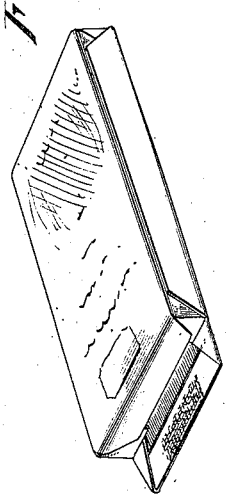
Inventor
Ignacio Lazaga
By Robertson & Johnson
Attorneys

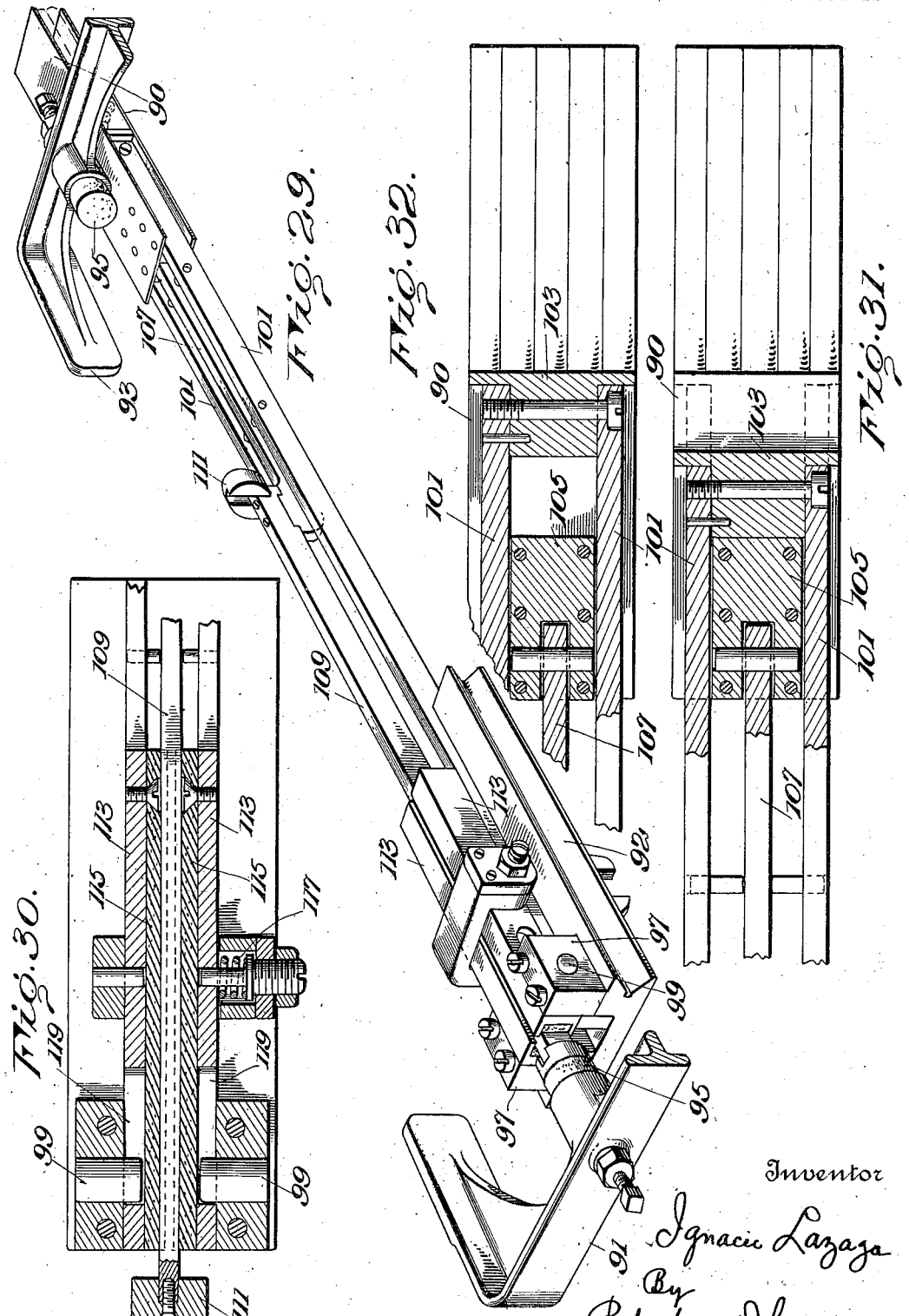

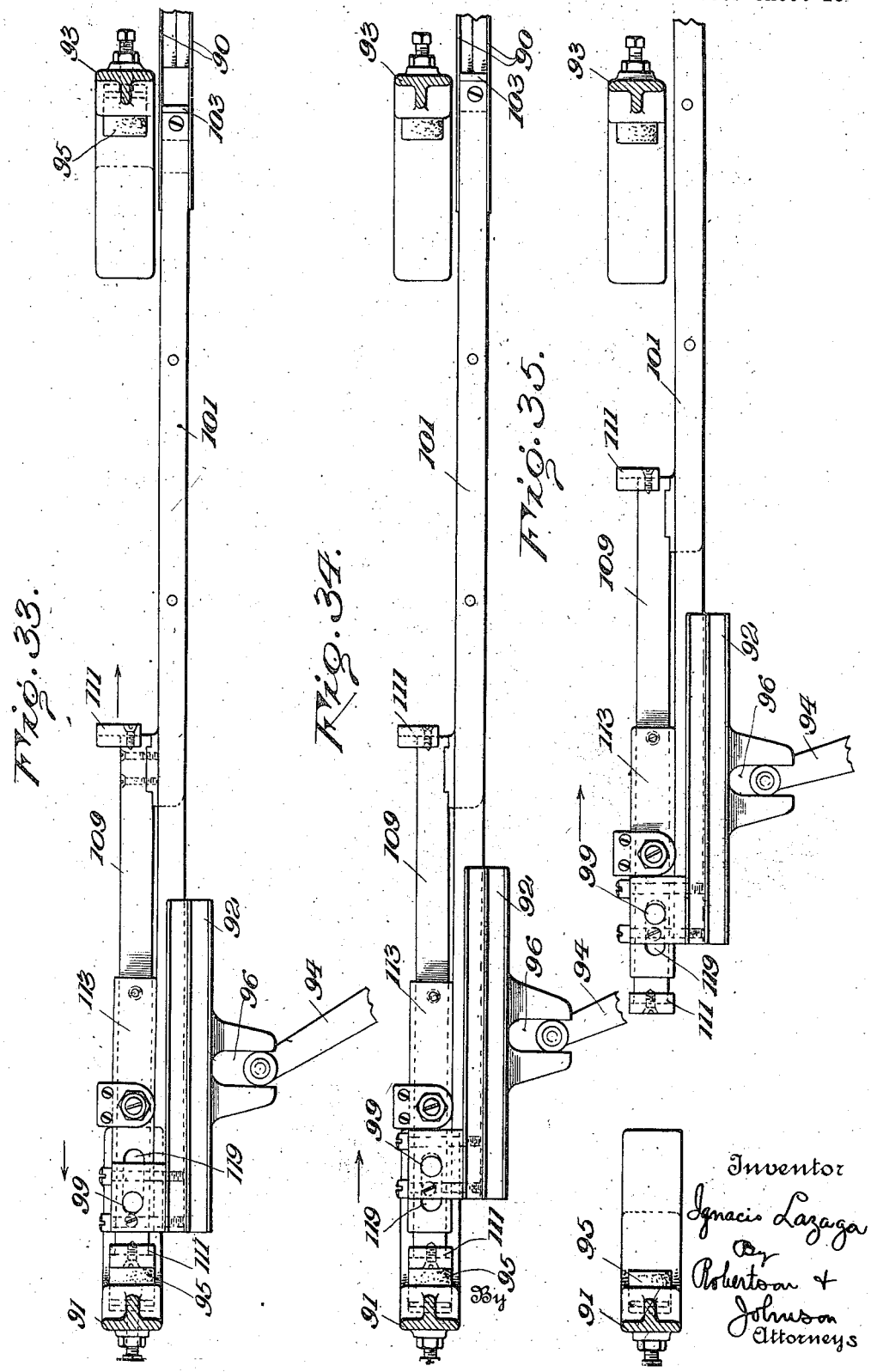

Patented Apr. 24, 1923.

1,452,692

UNITED STATES PATENT OFFICE.

IGNACIO LAZAGA, OF SALEM, VIRGINIA.

MACHINE FOR PACKAGING ARTICLES.

Application filed December 19, 1918. Serial No. 267,511.

*To all whom it may concern:*

Be it known that I, IGNACIO LAZAGA, a citizen of the Republic of Cuba, and a resident of Salem, in the county of Roanoke and State of Virginia, have invented certain new and useful Improvements in Machines for Packaging Articles, of which the following is a specification.

This invention relates to a machine for packaging articles such, for example, as cigarettes. One of the objects of this invention is a single machine which will rapidly and efficiently count off the articles to be packed, feed them into the path of an inside wrapper, preferably of tin foil, cut off a measured piece of material of just the proper size to form said inside wrapper, fold and wrap said inside wrapper around said articles, then feed an outside wrapper which may previously have been printed, and wrap and fold said outside printed wrapper around the already foil wrapped charge, a coupon, if desired, having already been fed between the two wrappers.

The invention relates to a machine for carrying out the foregoing object, and said machine, in its preferable, though not necessary, embodiment will be hereinafter described and claimed.

In the drawings accompanying and forming part hereof:

Fig. 1 is a side elevation of the entire machine.

Fig. 2 is a perspective view of the completed package as produced by the machine.

Fig. 3 is a perspective detail of a coupon feeder.

Fig. 4 is a perspective view of the tin foil supporting device.

Fig. 5 is a perspective view of part of the tin foil measuring and feeding mechanism.

Fig. 6 is a longitudinal section of the rear half of the machine showing the foil supporting, feeding and measuring mechanism, the coupon support and feeder, and the blank support and feeder.

Fig. 10 is a perspective view of the mechanism for feeding the blank wrappers.

Fig. 11 is a perspective view of parts of the coupon feeding belt.

Fig. 12 is a perspective view of the rock shaft and the eccentric rod for giving movement to the coupon feeder shown in Fig. 3.

Fig. 13 is a perspective view of the mechanism for cutting off the measured length of tin foil and for feeding said severed strips; this view also showing the trough for delivering the coupons at the proper point.

Fig. 14 is a sectional view of the cigarette hopper, the counting device, and the transverse channel through which the charge is transferred transversely of the machine.

Fig. 15 is a top plan showing the charge of cigarettes just before it shoves the severed tin foil through the folding mechanism, and at the right thereof, the wrapper blank in front of the wrapper folding device.

Fig. 16 is a side elevation of the parts shown in Fig. 15.

Fig. 17 is a side elevation of the paster for pasting the end flap to completely seal the package.

Fig. 18 is a top plan of the device for depressing the charge downward to force the pasted end in position and for sealing the pasted parts and for delivering the completed packages.

Fig. 19 is a perspective view showing the plunger as it has shoved the charge of cigarettes against the foil and just as the latter has been shoved partly into the folding mechanism (not shown).

Fig. 20 is a perspective view of the tin foil covered charge after the upper edge has been wiped down to form one of the sides.

Fig. 21 is a perspective view of the same after the lower edge has been wiped upwardly to form the side; this view also showing the coupon just above the foil wrapper, and the blank to one side ready for the tin foil covered charge and the coupon to be shoved against the wrapper blank to fold the latter.

Fig. 22 shows the charge after the wrapper blank has been doubled over it and the ends tucked in.

Figs. 23 and 24 are perspective views showing the package after the top and bottom edges have been wiped, respectively, downward and upward to form the ends.

Fig. 25 is a plan view, partly in section, of part of the machine showing the relative location of the folding, tucking and pasting parts.

Fig. 26 is a detail of the ejector and associated parts.

Fig. 27 is a side elevation of the parts shown in Fig. 25.

Fig. 28 is a perspective view of the package showing it in the position which it occupies when the final pasting is to be done, the outside wrapper projecting beyond the tin foil so that only the outer wrapper is pasted.

Fig. 29 is a perspective view of the mechanism for moving the cigarettes against the wrapper.

Figs. 30, 31 and 32 are sectional details of the same.

Figs. 33, 34 and 35 show the parts in different position.

Figure 7:
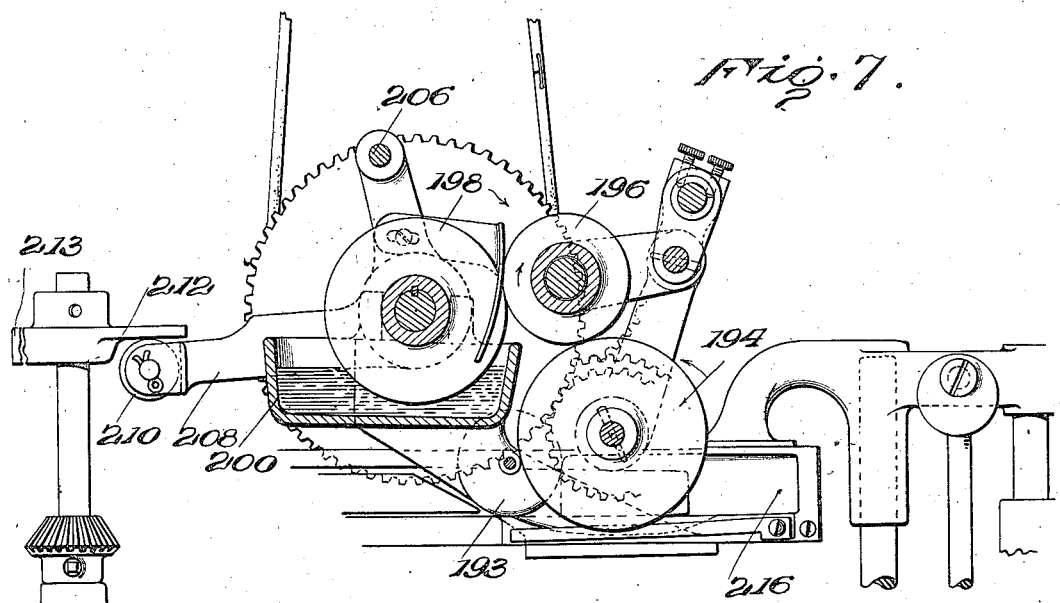
Fig. 7 is a side elevation, partly in section, of one of the pasters.

Referring now to the details of the drawings by numerals: 1 designates the main frame of the machine, comprising a bed 2 and an upper framework 3. Power may be supplied to the pulleys 4, 5, as shown, any form of belt shifter 6 being employed as desired. The fast pulley 4 drives the main shaft 9 which, through the gears 7 and 8, drives a transverse counter-shaft 10 and through bevel gears (one of which is shown at 12) a longitudinal counter-shaft 14. No invention is claimed in these driving and counter-shafts, and hence no further description thereof is needed; in fact they may be changed and modified as desired, and are shown as one way by which the various mechanisms, upon which the claims of invention are predicated, may be operated. No claims are to be based upon the cigarette hopper 16 shown in Fig. 14, nor its counting device 18, nor the horizontal transverse feeding channel 20 through which the charge of cigarettes is transferred from one side of the machine to the position shown in Fig. 15; by means of the usual slide 21, operated by the rod 19 (both shown in Fig. 1); hence all these parts, substantial equivalents of which are well known in the prior art, are shown in conventional form only. Invention is claimed in the manner in which the counted charge of cigarettes, as shown in Figs. 14 and 15, is first wrapped in tin foil, and subsequently enclosed in its final printed wrapper, a coupon having been first inserted between the inside foil wrapper and the printed wrapper, if desired. Therefore, the parts for performing these operations will now be described. At the rear end of the machine, as shown in Figs. 1 and 6, the upper frame 3 is formed with standards 22, one on each side of the machine. Each standard is formed with a vertical channel or groove 24 into which fits uprights 26 and 27 (see Fig. 4), the lower ends of which are supported by a roller 28 and the upper ends of which are notched to support a reel 30 of the tin foil. Said lower roller 28 rests upon and is supported by a feed roller 32 driven by bevel gearing 33, 34 from an upper counter-shaft 36, which in turn is driven from a vertical shaft 38 by bevel gearing 40; said shaft 38 being driven from the transverse counter-shaft by gearing (not shown). The foil from the reel 30 then passes downwardly as shown in Fig. 4 and between the two rolls 28 and 32, the lower of which is constantly driven, so that there is a constant feed given to the foil from the reel 30. In order to provide tension upon the foil and keep it taut, a weighted friction device 34 is used as shown in Fig. 4. Inasmuch as the whole weight of the heavy foil reel 30 is carried by the uprights 26 and 27, it follows that all the weight of the foil is carried by the roller 28. When said reel is full, more friction must be exerted between the rollers 28 and 32 to feed the foil than when said reel is smaller and lighter, and by suspending the weight of the reel upon the upper roller 28, the friction is entirely governed by the weight of the foil, so that as the foil is reduced and less friction is needed, there is less weight to cause pressure between said rollers 28 and 32. While the weight of the reel is, when in use, supported by the uprights 26 and 27 and their roller 28, the standards 22 are each provided with a recess 42, see Figs. 1, 4 and 6, into which each trunnion of the reel 30 may be placed when the machine is being provided with a new reel and it is necessary to thread the foil through the rollers 28 and 32 and forward to their measuring devices (to be hereinafter described) and when it is desirable that there shall be no friction placed on the foil.

From the feeding rollers 28 and 32, the foil is passed to a measuring device consisting of two rollers 44, a measuring roll. and 46, a pressure roll. It is desirable that the feed rollers 28 and 32 constantly feed the foil so that there shall be an even and uniform pull upon the foil whereby it will not be subject to any jerks likely to tear or injure it, and therefore it is advisable to feed the foil so that there shall be "slack" between the feed rolls and the measuring roll 44. To this end the circumference of the measuring roll is preferably equal to twice the length of foil that is to be fed, and in order to feed the foil during only part of the revolution of the measuring roll 44, the latter is formed with its circumference on two diameters as clearly seen in Figs. 5 and 6. The pressure roll 46 is pressed downwardly upon the larger part of the measuring roll 44 by means of the springs 48, Figs. 5 and 6, but said pressure roll cannot be pressed downward upon the reduced part of the measuring roll owing to the fact that adjustable stops 50 are employed. Hence the foil is fed only when the larger part of the measuring roll 44 is opposite the pressure roll 46. Said measuring roll 44 is driven by bevel gearing 52, 53 (see Fig. 5); the gear 52 being upon the same shaft 36 from which the feed roller 32 is constantly driven, and as both sets of gears 33, 34 and 52, 53 are of the same size, it follows the feed roll 32 and the measuring roll each makes a revolution during the same period. Hence as the foil is constantly fed by the rollers 28, 32, and intermittently by the measuring reel as the constantly rotating measuring roll 44 only feeds the foil during about half of its revolution, it follows that slack is provided in the foil and this slack is designedly just about sufficient to furnish the amount of foil that will be measured off by the measuring roll to form the foil wrapper. As a matter of fact, the circumference of the feed roller 32, instead of being the exact size to feed off the precise amount necessary to form a wrapper, is a small fraction of an inch less than the raised part of the measuring roll 44. This is to prevent an accumulation of slack between the feed rollers 28, 32 and the measuring roll 44. Hence the arrangement illustrated provides a steady uniform feed of the foil from the reel, combined with an intermittent feed after it passes to the feed roll to the point where the measured length is to be severed. The measuring roll 44 and the pressure roll 46 deliver the foil onto a table or support 56, at the end of which are a ledger plate 58 and a movable cutting blade 60, the cutting point of which is distant from a vertical line drawn through the axis of the rolls 44 and 46, the exact amount of foil measured and fed by said rolls. The movable knife 60 is in its raised position while the foil is being measured and fed to the cutter, but after the rolls 44 and 46 cease feeding the foil, the movable knife 60 is caused to descend to the position shown in Fig. 6 and sever the foil so that the measured length to the right of said cutters 58 and 60 drops downward through the chute 62 until it falls and rests upon the stop 64 shown in said Fig. 6. In order to ensure proper feeding of the severed foil, feed rollers 63—63 are provided, the larger of which is provided with a sprocket 65 (Fig. 13) operated from a sprocket chain 67 receiving motion from a sprocket wheel 69 (Fig. 5) rotating with the measuring roll 44 hereinbefore described. The smaller of the rollers 63 is spring pressed and the tension of its spring is just sufficient to feed the foil when it is released by the action of the cutters. The mechanism for moving the cutter 60 downward is shown in Fig. 13. As there shown, the cutter 60 is adjustably fixed to a transverse support 66, pivotally supported at 68, with its front end having a link 70 carrying a cam roller 72 movable in a cam groove 74 in a cam 76 fixed to the counter-shaft 36 before referred to. Said cam 76 has a cam surface 78 on its rear face which operates a cam roller 80 in such manner that when the large part of the cam surface 78 moves against the roller 80, the rock shaft 82 is rocked against the tension of its spring 84. This rock shaft carries a clamp 86, see Figs. 5 and 6, under which the foil passes, and the cam 76 is so timed that its large part 78 acts upon the roller 80 to rock the shaft 82 to move the clamp upon the foil just as the large part of the measuring roll 44 ceases to feed the foil. Therefore, at this moment the foil is clamped in order that, as the cam rotates, it may move the movable cutter 60 downward to sever the foil. During this time, the measuring roll 44 is moving with respect to the foil without feeding it, the cam 76 continues its rotation to move the cutter 60 upward ready for another cut, and the roller 80 moves onto the reduced part of the cam 76, permitting the spring 84 to rock the shaft 82 and slightly lift the clamp 86 to permit the foil to pass under said clamp without restraint as the larger part of the measuring roll 44 again feeds the foil.

Reference has been made to the fact that the severed strip of foil rests vertically upon the stop 64 (Fig. 6). As there shown, it is ready to have the charge of cigarettes 104, or whatever article or articles are being packed, (which have, in the meantime, been transferred across the machine through the transverse channel 20, Fig. 14 by means of the usual slide 21 operated by the rod 19), shoved forward against the foil to be wrapped therein. This action is accomplished by means of longitudinally movable plates 90 operated from a cross-head 92, which latter and the plates 90 are given an extended backward and forward movement by means of a long link 94, the upper end of which moves in a slot 96 in the bottom of the cross-head 92 and the lower end of which is pivotally supported at 98 (Fig. 1). This link is given movement by means of a crank arm 100 carried by the transverse countershaft 10 before described, said crank arm having its wrist pin movable in a slot 102 in said link 94. It follows from this construction that during one part of the cycle, the link 94, with its cross-head 92 and the plates 90, are moved longitudinally to the right as shown in Fig. 6 to move said plates and the charge of cigarettes (104, Fig. 6) against the wrapper, as will shortly be described, and during the time a new piece of foil is being measured and severed, said parts 94, 92 and 90 move back to the positions shown in said Fig. 6.

To return to the severed piece of foil which has been referred to as supported vertically upon the stop 64; the parts are now in the position where the feed rolls 28, 32, are feeding the foil to form a slack sufficient for another wrapper and the measuring roller 44, while rotating, is not feeding the foil, (see Fig. 6) and the link 94 is being moved to cause the cross-head 92 and its plates 90 and the charge of cigarettes to move slowly forward and shove said plates 90 and the charge against the foil vertically supported, as before recited, at 64, Fig. 6. This causes the plates 90 and the charge to shove the center of the foil between foil folding rollers 106, 108, doubling the foil into U-shape, as shown in Fig. 19, the doubled end being tucked in as indicated at 110 as the foil passes into the opening left by the walls 114, 116 of Fig. 15. As the plates 90 and the charge continue their shoving movement, the upper part of the U-shaped foil passes through the folder 118, Fig. 16, and folds it down as shown in Fig. 20, while the continued movement causes the folder 120 to act upon the lower side of the foil and fold it upwardly as shown in Fig. 21. At this point, the continued movement of the said plates 90 and the partially foil-wrapped charge will project it against the outside printed wrapper, but, if desirable, a coupon may be first fed onto the foil-wrapped charge, and hence this last operation will now be described.

At the upper part of Fig. 6 is shown a coupon receptacle and feeder. The receptacle is designated by the numeral 122 and the feeder by the numeral 124 (see also Fig. 3). This feeder 124 is given a reciprocating movement, so as to pass back and forth under the coupon receptacle 122, by means of a crank arm 126 supported at 128 and the arm 126 is periodically moved by an eccentric rod 130 (see Figs. 1 and 12) on an eccentric 132 operated by the shaft carrying the aforesaid foil feeder roller 32. Said feeder 124 has a wedge-shaped member 134 having two small needles 136 of just the proper height to strike on the under side of the lowest coupon only and move it forward as the feeder 124 is moved to the right in Fig. 6. This feeds the bottom coupon forwardly as shown by dotted lines in Fig. 6, the coupon being deflected downward by the deflector 138 until it falls upon a traveling belt 140 having slats 142 spaced apart just sufficient to retain a coupon between each two slats. The said slats 142 are cut away as shown at 143, see Fig. 11, and the deflector fits within said cut away portion, as the belt and its slats pass by said deflector. This belt 140 is constantly moving and is operated by means of a sprocket chain 144 which in turn is operated from the same shaft which operates the lower foil feed roller 32. As the coupons are delivered from the constantly moving belt 140, they, one at a time, drop through an inclined chute 146, the lower end of which is in just the proper position to drop the coupon upon the foil wrapped charge after the sides of the foil have been folded, see Figs. 6 and 21.

During the movements hereinbefore described, an outside wrapper has been fed so as to be in the path of the moving charge 104, Fig. 6, and it will be best to pause in the description of the movement of the charge, so as to describe the wrapper feeder. To the right of the coupon receptacle, as shown in Fig. 6, there is placed a wrapper holder and feeder. The pile of wrappers is indicated by the numeral 150. The bottom 151 of the receptacle 152 has projecting through it a feed roller 154, and above said roller is a gravity acting stop 156 against which the cards rest. The feed roller 154 has fixed to it a mutilated gear 158 (Fig. 10) which is driven from a segmental gear 160 fast on a gear 162 driven from a gear 163 on a shaft 164 on the other end of which is a sprocket 166 driven from a sprocket chain 67 which in turn is driven by the sprocket 69 rotatable with the driven measuring roll 44 as shown in Fig. 5. From this construction it follows that while the gear 160 constantly rotates, it rotates the gear 158 and its feed roller 154 for a half revolution, and then said feed roller is at rest until the gear 160 rotates during the other half revolution. Therefore the feed roller feeds a wrapper during one period and then rests for a like period before feeding the next wrapper. In order to ensure a proper feed of the wrappers, a rotatable jogger 172 is arranged so that as it rotates it passes upward against the bottom of the lowest wrapper and "jogs" it until its front end projects between the feed roller 154 and the gravity stop 156, so that the feed of the wrappers will be ensured. The jogger 172 is driven by a sprocket chain 174 as shown in Fig. 6. The wrapper, after it is fed by the roller 154, is projected between two rolls 176, 178, the first of which is fixed to and driven by the shaft 164. Hence the wrappers are intermittently fed by the intermittently driven feed roller 154 to constantly driven feed rolls 176, 178. From said feed rolls, the wrappers fall downward by gravity until they rest upon the fixed stop or support 180, (Fig. 6). As indicated in Fig. 6, this stop is slightly lower than the stop 64 upon which the foil strips rest, for a purpose to be described. To prevent any static electric effect between the wrappers as they pass by the guides 182, feed belts 184, 185 are provided, which are positively driven by the gears 186, 187, the first of which is connected by a belt 188 with a pulley on the driven shaft 164 before described. These belts 184, 185 ensure the proper feeding of the wrappers.

Figure 8:
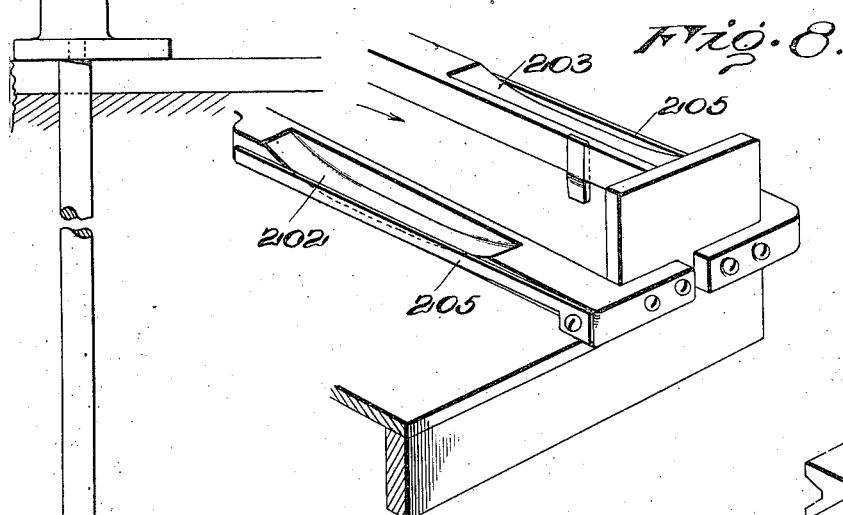
Fig. 8 is a perspective view of the part arranged to support the package while its side flaps are being pasted.
Figure 9:
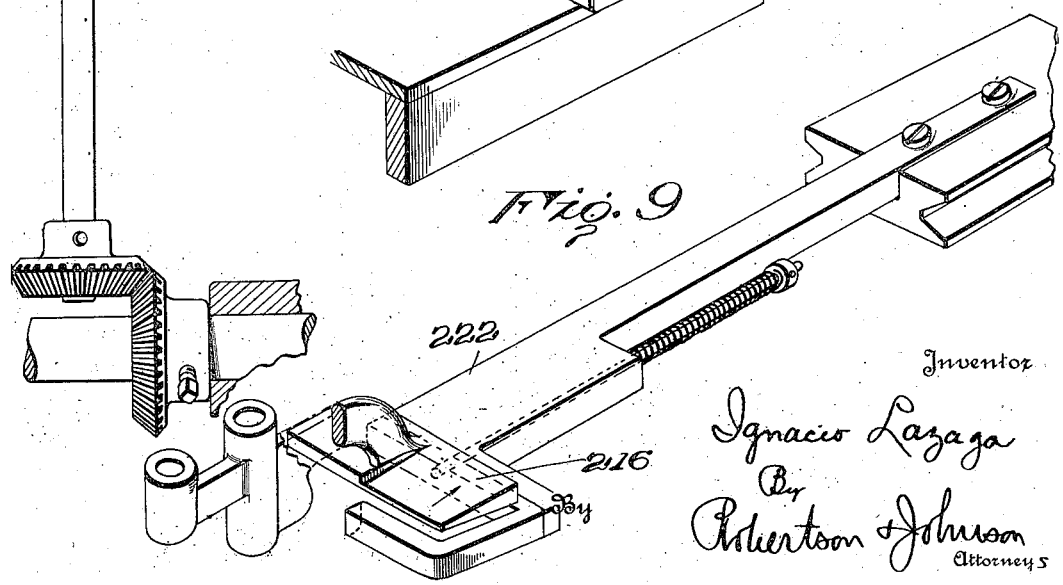
Fig. 9 is a perspective view of a plunger for moving the package transversely and of one of the depressers for moving the package down to seal the flaps.

Returning now to the movement of the tin-foil wrapped charge; as the plates 90 continue their movement longitudinally of the machine, they continue to press or shove the now foil-wrapped charge until they strike against the wrapper blank which has just previously dropped to the position shown in Fig. 6. As the charge moves under the coupon, the latter drops onto the top of the foil covered charge, and the charge, with the coupon, is pushed against the wrapper to double the same in the same manner as the foil was previously doubled. As the wrapper is passed through the rollers 190, 191 of Figs. 15 and 16, the wrapper is doubled and its ends tucked in as shown in Fig. 22. Continued longitudinal movement of the charge and wrapper causes the upper projecting edges of the wrapper to pass under two folding wheels or discs 193 in Figs. 7, 25 and 27. This causes the upper flap to be bent down as indicated in Fig. 23 and leaves the bottom flap projecting horizontally as shown by the same figure. Just beyond the folding wheels or discs 193 are two pasters 194, one of which is shown in Figs. 7 and 27, paste being applied thereto by the rollers 196 and 198, the latter entering the paste in the receptacle 200. The pasters 194 are directly over two grooves 202, 203 shown in Fig. 8, each of which is provided with a spring finger 205 adapted to prevent the flap from adhering to the bottom of the groove. The whole pasting device is pivotally supported at 206, and the receptacle has an arm 208 whose roller 210 is in the path of a cam 212. When in the position shown in Fig. 7, the parts are in the pasting position, but as soon as the pasting has been completed, the large part 213 of the cam 212 turns over the roller 210 and swings the arm 208 on the pivot 206 until the paster 194 is moved upwardly away from the grooves 202 and 203 so as not to drop a " blot " of paste upon the wrapper. After the package passes beyond the paster 194, the package is passed under a vertical plunger or presser 216 indicated in Figs. 7, 9, 25 and 27, which, operated from the shaft 14 by means of the rod 217, Fig. 1, shoves the package vertically downwardly, thereby folding the pasted edges against the sides of the package and sealing the same, see Fig. 24. The package is now complete except for tucking in the parts forming the free or open end shown in said Fig. 24. Just as the plunger 216 moves the package down, it gets in the path of end tuckers 220 shown in dotted lines in Fig. 25 which are geared to move in unison and when released by the cam 221 (operated from the shaft 14 by means of the rod 223) are caused to spring inward to tuck in the ends to the position shown in Fig. 28. At this time, the transversely movable plunger 222 of Fig. 9 moves the package transversely from the position under the plunger 216 in Fig. 25 until it gets under a second plunger or depresser 230 shown in said Fig. 25, operated from the shaft 14 by means of a rod 231, and during its travel, the package passes by the roller 232 which wipes down the projecting top of the end of the package to the position shown in Fig. 28 when the end is ready to be pasted. The package in the shape shown in Fig. 28 is now under the depresser shown in Fig. 25, and it rests there long enough for an oscillating paster 234 to be moved downward until its pasting roll 236 contacts with the projecting end and deposits paste thereon as shown in Fig. 28. The paster is shown in Fig. 17 and as there shown the paster 234 is pivotally carried by the shaft 238 and is normally in the position shown in dotted lines so that the paster roll 236 is in contact with a paste feeding roll 240 which is geared to and in contact with a roller 242 in the paste reservoir 244, gears 245 and 246 being upon the rolls 240 and 242 respectively. The gear 246 has a crank arm 248 which, in rotating with the gear 246, once in each revolution, strikes against and moves a lever 250, the other end of which is provided with a rack 251 which is in mesh with a gear 252 on the paster shaft 238 so that once in each revolution of the gear 246, the parts are actuated to rock the shaft 238 to move the paster 234 so that its roll 236 moves from the dotted line position to the full line position in Fig. 17 and thereby deposits paste upon the projecting end of the flap. Reference has before been made to the fact that the support 180 for the wrapper blank is lower than the support 64 for the foil blank, as shown in Fig. 6; therefore, after the box is folded ready for the final pasting, the end of the wrapper blank projects beyond the end of the foil blank, as shown in Figs. 17 and 28, so that the oscillatory paster just described will deposit paste only on the paper wrapper blank and not upon the foil inside wrapper. I deem this of importance.

The final pasting being now done as just described, the plunger 230 shown in Figs. 18 and 25 is now caused to move downward by the movement of the rod 231 in Fig. 1, and causes the pasted end to be wiped against a wall 256 shown in Fig. 17 and thereby paste the end flap in position. The completed package is now in alinement with an ejecting plunger 260 shown in Figs. 25 and 26, which is caused to move in the direction of the arrow in Fig. 25 and move the package from under the depresser 230 between two endless belts 262, 263. These belts need not be driven as they merely hold the packages in position until they are delivered into any suitable hopper or boxes, each package, as it is shoved by the ejector, pressing against and moving the packages in front of it. However, just as the ejector moves the package into the position shown in Fig. 25, the package is moved over a spring actuated end flap retainer 264 which, acting under the influence of its spring 265, springs upward just as the ejector moves backward for another package, and thus the end flap retainer holds the pasted end in sealing position until the next package is thrust against it by the next reciprocation of said ejector.

In some machines of this character, the charge of cigarettes is shoved directly against the wrapper, and while my machine may be so used, I have referred to plates 90 between which the charge of cigarettes is located when the latter, inside of said plates, moves against the foil to double it over into the position shown in Fig. 19. These plates 90 therefore take all the strain off of the cigarettes, and hence avoid the possibility of buckling the latter. The construction of the mechanism by which these plates 90 are operated will now be described in detail; the description so far given having recited that the plates 90 are longitudinally movable and operated from a cross-head 92, which latter and the plates 90 are given an extended back and forward movement by means of the longitudinal link 94, etc. Reference should now be made to Figs. 29 to 35, which show the mechanism in detail, to Fig. 6, and to Figs. 19 to 24. As shown in Fig. 29, there are two fixed parts 91 and 93 of the frame, each having a rubber cushion 95. The aforesaid cross-head 92 slides with respect to the said two frame members 91 and 93 and has connected to it, so as to travel with it, two blocks 97, each of which has a pin 99, said pins projecting toward each other as shown in Fig. 30. Said cross-head 92 also has connected to, and movable with, it, two longitudinal bars 101, the outer ends of which are connected to a cross-head 103 (Figs. 31 and 32). Straddling the ends of the bars 101 and the cross-head 103 are the plates 90 before mentioned which are movable with respect thereto; said plates being screwed to a block 105, and the latter is connected to one end of an extension bar 107, the other end of which is rigidly connected to a friction bar 109. Each end of this friction bar 109 has a bumper 111 in line with one of the rubber cushions 95 and one end slides frictionally between two channel-bars 113 having frictional linings 115 (Fig. 30) which are pressed frictionally against the friction bar 109 by the spring tension device 117 (Figs. 29 and 30). Said channel irons are slotted as shown at 119 to receive the inner ends of the aforesaid pins 99. The aforesaid plates 90 project forward and are spaced the proper distance to permit a charge of cigarettes to be moved transversely therebetween as they are transferred through the transverse channel 20 (Fig. 14) as before described. These parts operate as follows: When the cross-head is moved from the position shown in Fig. 6, said cross-head 92 and its blocks 97 and the longitudinal rods 101 all move to the right as viewed in Figs. 29, 33, 34 and 35. Before any movement takes place, the parts are in the position shown in Figs. 31 and 33 where the charge is shown as having been projected between the plates 90. The initial movement of the cross-head moves the blocks 97 and their pins 99 to the limit of the slots 119, which slots are substantially the same length as the space between the cross-head 103 and the cigarettes (Fig. 31), and during this movement, the friction bar 109 is frictionally held from movement while the longitudinal rods 101 are moved with respect thereto. This causes the cross-head 103 to move away from the block 105, and by the time the pins 99 reach the ends of the slots 119, the cross-head 103 has moved against the charge of cigarettes as shown in Figs. 32 and 34. Further movement of the cross-head 92 will now cause all the parts to move together so that the charge of cigarettes within the plates 90 is projected against the vertically supported tin foil to fold the latter over the said plates and the charge as hereinbefore explained. This simultaneous movement continues until the foil has been wrapped around the charge and the outside wrapper has been doubled over the foil wrapped charge. When the bumper 111 on the friction bar 109 strikes against the cushion 95 on the fixed frame 93, said friction bar, with its extension bar 107, the block 105 and the plates 90 are all arrested, while the cross-head 92 and the rods 101 and the cross-head 103 all move forward. This causes the charge, now wrapped, to be shoved out from between the plates and into the pasting devices as before described. The parts on the reverse movements are of course returned to the positions shown in Figs. 29 and 33.

It will thus be seen that I have provided a device as the plates 90 which serve as a plunger and also to protect the cigarettes and prevent them from becoming crushed under the pressure of dragging the tin foil and the wrapper through the folding devices. It will also be seen that the sides and ends of the metal plates 90 constitute a better support to form regular shaped and sized packages over, breaking the corners of the wrappers more perfectly. A further advantage is that when the plates are withdrawn, leaving the cigarettes in the wrappers, the latter are packed loose so as to preserve their form. The metal plates 90 also make it possible to pack cigarettes in stiff cardboard which would be impossible with unprotected cigarettes.

From the foregoing and the accompanying drawings, it will be seen that I have provided an organized machine which will automatically feed, measure, cut and fold an inside delicate wrapper around a charge as cigarettes, and either with or without a coupon, feed, wrap and paste an outside printed wrapper to form a complete package, no attention to the machine being necessary except to see that the articles to be wrapped, and the material for the wrappers, shall be properly supplied.

It will be obvious that various changes and modifications may be made in the machine without departing from the spirit of the invention, the scope of which may be determined from the appended claims.

What I claim as my invention is:

1. A wrapping machine including inside wrapping mechanism, means for cutting the inside wrapper into predetermined lengths, means for conducting the inside wrapper to a position across the path of the articles to be wrapped, an open-sided movable plunger, means for charging said plunger from one side, means for forcing the plunger with its contents against the inner wrapper, folding mechanism through which the plunger travels with the wrapper and by means of which the latter is wrapped around three sides of the plunger and articles contained therein, means for feeding an outside wrapper into the path of the plunger and means for wrapping said outside wrapper around the plunger and its contained articles and the inner wrapper in a continued forward movement of the plunger, means for pasting the outside wrapper at the edges and open end and endless belts between which the wrapped article is conducted and by means of which the pasted side-flaps are made to adhere during the passage of the wrapped articles therethrough.

2. A wrapping machine including inside wrapping mechanism, means for cutting the inside wrapper into predetermined lengths, means for conducting the inside wrapper to a position across the path of the articles to be wrapped, an open-sided movable plunger, means for charging said plunger from one side, means for forcing the plunger with its contents against the inner wrapper, folding mechanism through which the plunger travels with the wrapper and by means of which the latter is wrapped around three sides of the plunger and article contained therein, means for feeding an outside wrapper into the path of the plunger and means for wrapping said outside wrapper around the plunger and its contained articles and the inner wrapper in a continued forward movement of the plunger, means for pasting the outside wrapper at the edges and open end and endless belts between which the wrapped article is conducted and by means of which the pasted side-flaps are made to adhere during the passage of the wrapped articles therethrough, a card feeder and means for feeding cards to the package at a point between the first and final wrapper.

3. In a wrapping machine, the combination of an inside wrapper feeder, an outside blank feeder, a support for the inside wrapper after it leaves the wrapper feeder, a support for the outside blank after it leaves the blank feeder, folding devices located between said supports for folding the inside wrapper around the charge, a plunger comprising a pair of plates arranged to receive a charge laterally between them, said plates moving with the charge against the inside wrapper and folding it and moving the wrapped charge against the outside blank to fold the latter around the wrapped charge, a paster arranged to paste the side edges of said outside blank, a depresser for moving said charge downward to seal said pasted side edges, a paster arranged to paste the end flap of the outside blank, and a depresser for moving said package down past a sealing member to seal said pasted end flap.

4. A wrapping machine including inside wrapping mechanism, means for cutting the inside wrapper into predetermined lengths, means for conducting the inside wrapper to a position across the path of the articles to be wrapped, an open-sided movable plunger, means for charging said plunger from one side, means for forcing the plunger with its contents against the inner wrapper, folding mechanism through which the plunger travels with the wrapper and by means of which the latter is wrapped around three sides of the plunger and articles contained therein, means for feeding an outside wrapper into the path of the plunger and means for wrapping said outside wrapper around the plunger and its contained articles and the inner wrapper in a continued forward movement of the plunger, means for pasting the outside wrapper at the edges and open end and endless belts between which the wrapped article is conducted and by means of which the pasted side-flaps are made to adhere during the passage of the wrapped articles therethrough, a plunger having a movable cross-head therein and means for stopping the movement of the plunger at a predetermined point while the movement of the cross-head is continued to eject the contents of the plunger therethrough.

5. In a wrapping machine, the combination of an inside wrapper feeder, an outside blank feeder, a support for the inside wrapper after it leaves the wrapper feeder, a support for the outside blank after it leaves the blank feeder, folding devices located between said supports for folding the inside wrapper around the charge, a plunger for moving a charge against the inside wrapper and folding it and moving the wrapped charge against the outside blank to fold the latter around the wrapped charge, a paster arranged to paste the side edges of said outside blank, a depresser for moving said charge downward to seal said pasted side edges, a paster arranged to paste the end flap of the outside blank, a depresser for moving said package down past a sealing member to seal said pasted end flap, and a spring actuated end flap retainer to hold said pasted end flap in sealing position.

6. In a wrapping machine, the combination of an inside wrapper feeder, an outside blank feeder, a support for the inside wrapper after it leaves the wrapper feeder, a support for the outside blank after it leaves the blank feeder, folding devices located between said supports for folding the inside wrapper around the charge, a plunger for moving a charge against the inside wrapper and folding it and moving the wrapped charge against the outside blank to fold the latter around the wrapped charge, the aforesaid supports being arranged so that when the outside blank is folded around the wrapped charge the end of the outside blank will project beyond the end of the inside wrapper to provide a pasting end, a paster arranged to paste the side edges of said outside blank, a depresser for moving said charge downward to seal said pasted side edges, a paster arranged to paste the end flap of the outside blank, a depresser for moving said package down past a sealing member to seal said pasted end flap, and a spring actuated end flap retainer to hold said pasted end flap in sealing position.

7. In a wrapping machine, the combination of a device for counting the articles to be wrapped, an inside wrapper feeder, an outside blank feeder, supports for holding said inside wrapper and said outside blank after they are fed, folding devices between said supports for folding the inside wrapper, means for transferring the counted charge from the counting device to a position in front of the inside wrapper as it is located on its support, and a plunger comprising a pair of plates arranged to receive a charge laterally between them, said plates moving with said counted charge against the inside wrapper to partially fold the latter around the charge and to then move the partially wrapped charge against the outside blank to fold the latter around it.

8. In a wrapping machine, the combination of a device for counting the articles to be wrapped, an inside wrapper feeder, an outside blank feeder, supports for holding said inside wrapper and said outside blank after they are fed, folding devices between said supports for folding the inside wrapper, means for transferring the counted charge from the counting device to a position in front of the inside wrapper as it is located on its support, a plunger comprising a pair of plates arranged to receive a charge laterally between them, said plates moving with said counted charge against the inside wrapper to partially fold the latter around the charge and to then move the partially wrapped charge against the outside blank to fold the latter around it, a paster arranged to paste the side edges of the outside blank, a depresser for moving said charge downward to seal said pasted side edges, a paster arranged to paste the end flap of the outside blank, and a depresser for moving said package down past a sealing member to seal said pasted end flap.

9. In a wrapping machine, the combination of a reel carrying a strip to form an inside wrapper, a measuring device for measuring off strips in predetermined lengths, a device for severing said material to form the strips as measured by said device, an outside blank feeder, supports for holding said measured strips and said outside blanks in juxtaposition, folding devices located between said supports for folding the inside wrapper around the charge, and a plunger comprising a pair of plates arranged to receive a charge laterally between them, said plates moving with the charge against the inside wrapper as it is held upon its support and partially folding the same around the charge and for moving the partially wrapped charge against the outside blank to fold the latter around it.

10. A wrapping machine including in combination, a plunger, independent means for feeding two different wrappers in the pathway of the plunger, independent means for holding these wrappers successively in front of the plunger, a plunger for moving the package down, a transversely movable plunger for moving the package transversely from its position under the last-mentioned plunger, a depresser beneath which the package is forced by the transversely movable plunger, a pasting mechanism for pasting the flaps of the package and endless belts between which the packages are carried after being pasted and passing from beneath the depresser.

11. A wrapping machine including in combination, an opened side plunger, means for charging said plunger through an open side, means for feeding wrappers into the path of the plunger, means for moving the plunger with the articles to be wrapped successively against said wrappers, means for stopping the plunger after the wrappers have been folded therearound, and means within and forming part of the plunger for ejecting the contents of the plunger which means continues to move after the open sided part of the plunger has stopped.

12. A wrapping machine including an open-sided plunger, means for filling the latter from a side means for folding a wrapper around the plunger whereby the wrapper is formed without applying pressure to the articles wrapped, and means within and forming part of the plunger that travels through the plunger after the wrapper is completed for ejecting the contents of the plunger and through it the wrapper from the plunger.

13. In a wrapping machine and in combination with the mechanism for wrapping a blank around a charge, a pasting device comprising a paste receptacle and pasting rollers, means for periodically moving said paste receptacle and its rollers downward so that the paste roller contacts with the blank to be pasted, a support for the article being pasted located under said pasting roller, and a spring for moving the pasted edge away from said support as the pasting roller moves to its normal position.

14. In a wrapping machine, the combination of an inside wrapper feeder, an outside blank feeder, supports for the blanks fed therefrom, folding devices between said supports, means for folding the inside wrapper around a charge, and a coupon feeder adapted to deposit a coupon onto the inside wrapper after it has been wrapped around said charge and before the outside blank is wrapped around the same.

15. In a wrapping machine, the combination of a reel, mechanism for cutting off measured strips of said reel, a support for holding said measured strips in position, an outside blank feeder, a support for holding said outside blanks, one at a time, in juxtaposition to the support for the inside wrappers, folding means located between said supports for folding the inside wrapper around a charge, and a coupon feeder arranged to deposit a coupon onto the inside wrapper after it is partially wrapped around the blank and before the outside blank is folded around the charge.

16. In a wrapping machine, the combination of a reel carrying material to form inside wrappers, a device for measuring off strips from said reel, a cutting device arranged to cut the measured strips, a support for holding the measured strips in position, an outside blank feeder, a support for holding the outside blanks in position, a folding device located between said blank supports, a plunger arranged to move a charge against the inside wrapper and fold the same around the charge, and a coupon feeder adapted to deposit a coupon upon the partially wrapped charge before the plunger projects the same against the outside wrapper, and means for folding the outside wrapper around the partially wrapped charge and the coupon.

17. In a wrapping machine, the combination of a reel carrying material to form inside wrappers, a device for measuring off strips from said reel, a cutting device arranged to cut the measured strips, a support for holding the measured strips in position, an outside blank feeder, a support for holding the outside blanks in position, a folding device located between said blank supports, a plunger arranged to move a charge against the inside wrapper and fold the same around the charge, a coupon feeder adapted to deposit a coupon upon the partially wrapped charge before the plunger projects the same against the outside wrapper, means for folding the outside wrapper around the partially wrapped charge and the coupon, and means for pasting the outside wrapper and for sealing the same.

In testimony whereof I affix my signature.

IGNACIO LAZAGA.